United States Patent
Konecny et al.

[15] 3,674,224

[45] July 4, 1972

[54] FAN-TYPE AIRCRAFT AND HOT-GAS STRUCTURE THEREFOR

[72] Inventors: Jan Konecny, Buxtehude; Jan T. Haas; Hans E. Groenewald, both of Hamburg, all of Germany

[73] Assignee: Hamburger Flugzeugbau GmbH, Hamburg-Finkenwerder, Germany

[22] Filed: Feb. 17, 1970

[21] Appl. No.: 11,971

[30] Foreign Application Priority Data

March 21, 1969 Germany.....................P 19 14 474.2

[52] U.S. Cl..............................................244/12 B, 60/226
[51] Int. Cl.........................................................B64c 15/14
[58] Field of Search...............244/12, 23; 285/133; 137/604; 138/39, 44, 114; 60/226, 262; 239/429, 430; 259/4, 18

[56] References Cited

UNITED STATES PATENTS

| | | | |
|---|---|---|---|
| 1,813,189 | 7/1931 | Moore | 239/430 |
| 2,764,455 | 9/1956 | Seibel | 239/430 |
| 3,269,663 | 8/1966 | Strobl | 244/23 |
| 3,375,997 | 4/1968 | Gist, Jr. | 244/12 B |
| 3,499,620 | 3/1970 | Haberkorn et al. | 244/12 A |

FOREIGN PATENTS OR APPLICATIONS

| | | | |
|---|---|---|---|
| 1,002,462 | 8/1965 | Great Britain | 60/226 |
| 1,012,590 | 12/1965 | Great Britain | 60/226 |

*Primary Examiner*—Milton Buchler
*Attorney*—Karl F. Ross

[57] ABSTRACT

An aircraft is disclosed whose fixed airfoils and/or fuselage is provided with one or more fans for producing lift, forward thrust or both, wherein the motive power for the fans is derived from the formation of hot gases in an external-combustion system such as a gas-generating turbine. The gas generator is of the two-stage type having a high-temperature output which is communicated to the fans by an inner duct composed of a thin-wall refractory metal. The relatively low-temperature output of another stage of the gas generator (e.g. the compressor) is communicated to the fans by an outer duct coaxially surrounding the inner duct whereby the outer gas layer (generally of air) forms an insulating sheath for the higher-temperature gases traversing the inner duct.

8 Claims, 7 Drawing Figures

PATENTED JUL 4 1972　　3,674,224

Inventors,
JAN KONECNY
BY JAN T. HAAS
HANS E. GROENEWALD
Karl J. ?
ATTORNEY 3,674,224

FAN-TYPE AIRCRAFT AND HOT-GAS STRUCTURE THEREFOR

1. FIELD OF THE INVENTION

Our present invention relates to fan-type aircraft and especially fixed-airfoil aircraft having lift, cruise or lift-and-cruise fans driven by hot gases.

2. BACKGROUND OF THE INVENTION

In recent years the attention of the aircraft industry has increasingly been drawn to fixed-airfoil or fixed-wing aircraft of the short-takeoff-and-landing type, i.e. so-called STOL fixed wing aircraft, or vertical-takeoff-and-landing (VTOL) type, in which at least part of the lift is provided, independently of the airflow across the fixed airfoils, by fan assemblies which produce a downward flow of air and generate an upward thrust or lift to facilitate ascent of the aircraft, to control the descent thereof or to provide for hovering flight.

In addition, or in combination with such lift-generating fans, so-called cruise or propulsion fans may be provided to generate a forward thrust accelerating the aircraft in the horizontal direction. A single aircraft may be provided with lift fans and other engine means, e.g. conventional propeller drives, turbo-propeller drives and jet-engine drives, to provide the forward thrust, with fans providing part or all of the forward thrust while the aforementioned lift fans or other means generate the additional lift prior to passage of substantial volumes of air across the fixed airfoils, and combined fan structures or assemblies of the lift-and-cruise type in which the outflow of the assembly can be directed primarily downwardly to provide lift or primarily rearwardly to provide forward thrust, or oriented to distribute the resultant thrust an any angle between these principal directions of orientation in accordance with the desires of the aircraft operator.

In the commonly assigned copending application Ser. No. 834,647 filed June 19, 1969 by Hans Lucius Studer (now abandoned), for example, there is described and claimed a fixed-wing aircraft having dual-function fans at the fixed airfoils in addition to lift-generating fans upon the fuselage. In this aircraft and in certain other STOL-type aircraft, the fan fulfills a dual purpose by virtue of deflectors, baffles or control flaps which are provided to direct the air stream selectively downwardly or rearwardly and thereby produce propulsion or lift or proportionately distribute the thrust between a propulsion component and a lift component.

As pointed out in that application, moreover, the fans are preferably driven by external-combustion means, e.g. by hot gases, generated in gas-producing installations independent of the fans or respectively associated therewith, but apart from the fan structures themselves.

In such arrangements, a plurality of hot-gas generators may be provided in or on the body of the aircraft (the fuselage, fixed airfoil structures, the tail structure or the nose structure) and are connected with the lift-and-cruise fans of the airfoils and the fans of the fuselage by hot-gas ducts. Generally, the intake ends of the fan assemblies are provided with arrays of turbine buckets, vanes or scoops constituting a driven turbine which cooperates with a gas-distributing scroll of the surrounding housing to drive the fan blades which are affixed to the driving turbine blades of the rotor member of the fan assembly. The fan blades in turn induce air to flow through the housing and eject the air axially rearwardly of the rotor.

To control the flow of hot gases through the ducts connecting the hot-gas deflectors with the fans, which may be proximal to or distal from the gas deflectors, manually or automatically regulated valves may be provided independently of, or in conjunction with, check-valve systems. In the event of failure of one of the gas deflectors, means is usually provided to balance the lift or forward thrust of the fans by a corresponding redistribution of the remaining generator gas supply. This system insures uniform distribution of thrust at all fanS and therefore does not give rise to any unbalanced force which must be resisted by compensating controls or actions on the part of the operator of the aircraft.

The ability to connect gas generators, which may be located on one side of the aircraft, to fans located on the opposite side, as is necessary in the crosscoupling envisioned to redistribute the gas in the event of failure of one of the generators, requires relatively long gas-supply ducts which may traverse the fuselage and airfoil structures over considerable distances. In the copending application mentioned above, moreover, it is pointed out that failure of one of the gas generators feeding the lift-and-cruise fans of a STOL-type aircraft may under some circumstances cause the aircraft to yaw, i.e. to swing about the yaw axis. This may be countered, according to the system of that abandoned applicatiOn, by providing along the elongated fuselage one or more downwardly directed fans so arranged as to have a plane of resultant lift thrust or of lift-thrust symmetry extending perpendicularly to the longitudinal axis of the fuselage and preferably located slightly beyond the center of gravity of the aircraft.

The aircraft is provided with a number of hot-gas generators (e.g. gas turbines) each of which is connected tangentially to one of the segmental compartments or scrolls of the housing of each of the lift-and-cruise fans of the fuselage while branch ducts, which may be relatively long, connect the conduits between each hot-gas generator and the respective compartments of each fan.

In the copending application Ser. No. 2,590 filed Jan. 13, 1970, entitled AIRCRAFT WITH LIFT AND CRUISE FANS, there is described an arrangement using some of the principles of the earlier application in which, however, the energy losses arising from deflection of the effluent gas stream from the fans can be reduced or eliminated. In this system the entire fan assembly, consisting of the gas-distributing scrolls along the periphery of the fan assembly, the rotor mechanism including the air-displacement blades and the array of turbine-like scoops or blades of the driving portion of the rotor, the central air-guide body of the assembly (if any), and an apron surrounding the rotor and funneling the gases rearwardly, is pivotally mounted in or adjacent a forwardly open air channel to orient the principal axis of the assembly parallel to the direction of flight or at any angle to this direction ranging between 0° and 100° or thereabove.

The pivot axis, which extends perpendicularly to the longitudinal axis of the air inlet duct and, therefore, to the principal axis of the aircraft in horizontal flight, may lie in a plane corresponding to the plane of the array of turbine blades of the rotor or proximal to the latter plane. Electric, hydraulic or pneumatic means may be provided for displacing the fan assembly, while the gas-supply ducts connecting the gas turbines or gas generators with the scrolls of the fans communicate with the latter along the pivot axis so that no change in the effective cross-section of the gas-flow path occurs with swingable displacement of the fan assemblies. In this fashion, it is possible to redirect the outflow of the fan assemblies from the horizontal to the vertical and therebeyond, or at any angle between horizontal and vertical, to provide solely forward thrust, solely vertical lift, or any selected ratio of lift component to thrust component. In the last-mentioned application, moreover, it is pointed out that each fan assembly preferably is mounted on or forms a unit with a respective hot-gas generator. AlthOugh this minimizes the length of the gas-supply duct, it is nevertheless advantageous to crosscouple the hot-gas generators and the turbines with ducts extending therebetween and traversing a major part of the length of the airfoils.

In general, it may be said in connection with these last-mentioned types of aircraft using lift and cruise fans, as well as prior-art systems, that the delivery of high-temperature gases from the generators to the fans is inconvenient, dangerous and fraught with problems. For example, thermal loss through the ducts bridging the gas generators and the fan assemblies is a major problem since fan efficiency depends upon a maximum energy content in the gases delivered to the driving buckets or scoops of the respective fanS. Moreover, the high temperatures of the gases traversing the ducts, temperatures which may be in the region of 950°K or thereabove, cause thermal stress and accelerated metal fatigue and even the danger of fire or explosion. To avoid these problems, it has been common practice to insulate the gas-carrying ducts with mineral insulation (e.e. fiberglass), to enclose the ducts in packed housings, and/or to locate the ducts in regions in which only minimum damage can result from the heat. These expedients are not always satisfactory even for the purpose for with they are intended and invariably increase the space required for the duct systems, the weight thereof and the cost of the arrangements.

3. OBJECTS OF THE INVENTION

It is, therefore, the principal object of the present invention to provide an improved aircraft having one or more hot-gas generators, one or more fans capable of providing lift or forward thrust, or both, and one or more ducts connecting the gas generators with the fans, wherein the aforementioned disadvantages are avoided.

Another object of our invention is to provide a lift-and-cruise assembly for a fixed-airfoil aircraft which is of lower cost, requires less space, is of reduced weight and is more efficient than earlier systems of the same general type.

A more specific object of the invention is to provide a lift and/or cruise fan-drive arrangement wherein mineral insulation of the ductwork delivering hot combustion gases to the fan can be eliminated.

It is another specific object of the invention to provide a duct system for delivering hot gases to a lift and/or cruise fan assembly in which the danger of fire, heat loss and damage to the structure of the aircraft is reduced or eliminated.

4. SUMMARY OF THE INVENTION

The above and other objects are attained, in accordance with our present invention, in an aircraft having a gas-powered rotor assembly, e.g. lift and/or cruise fans, and one or more two-stage gas generators or a gas generator having at least two stages, one stage of which produces a high-temperature, high-pressure gas stream while the other stage produces a relatively cooler or low-temperature gas stream.

According to the principles of the present invention, the ductwork connecting the gas generator with the fan comprises a pair of coaxial conduits through an inner one of which the high-temperature gas is delivered to the fan, while the relatively lower-temperature gas (e.g. compressed air) forms a sheath around the high-temperature duct and insulates the latter from the remainder of the aircraft structure. Both flow paths of the coaxial ducts terminate at the rotor assembly. When reference is made herein to a two-stage gas generator, therefore, it should be understood that any number of stages in excess of two are also envisaged and that the two stages may include an initial compression stage and a single turbine stage as will be apparent hereinafter. Consequently, when two coaxial ducts are used, the inner duct carries the high-temperature gas from, for example the high temperature turbine stage or the sole turbine stage, whereas the outer duct carries, in the passage between itself and the inner duct, either a lower-temperature gas from a low-temperature turbine stage or excess air from the compressor stage.

According to an important feature of the invention, the inner hot-gas duct is constituted as a thin-walled inner tube, preferably of a refractory metal, which is concentrically surrounded by an outer tube which may be both thicker and composed of less expensive light metal or a light-metal alloy (aluminum, magnesium or an aluminum-magnesium alloy). The relatively cool air of the low-temperature stage of the gas generator thus constitutes an insulating layer and the entire cross-section of the assembly may approximate the flow cross-section of earlier ductwork since the system is insulated. The reduction in space, weight and cost will be self-evident. It has been found that this arrangement is most suitable with temperatures above 950° K at which temperature all earlier systems required massive insulation.

According to a further feature of this invention, the inner duct terminates ahead of the inlet of the ductwork into the scrolls or housing of the fan assembly so that the hot gases of the inner duct mix with the relatively cooler gases of the sheath and the mixed gas passes into the scrolls. It is also possible to provide for a mixture of the hot gases and the cool gases in the guide blades of the driving turbine of the fan or well ahead of the scroll or even therewithin. The choice of the location of such mixing will depend upon the desired fan efficiency and spatial considerations. To ensure a continuous mixture of the cool-gas sheath with a hot-gas core, it has been found desirable to provide a plurality of stepped transition tubes at the end of the inner duct, the tubes serving to ensure efficient mixing.

According to still another feature of this invention, the outer duct carries the inner duct centrally and coaxially, via a plurality of struts, webs or support members which may be rods, bars or strips extending generally tangentially to the inner duct, preferably in angularly equispaced relationship around the axis of the ducts and welded or otherwise affixed to the outer duct. Advantageously, these members extend in the same sense and may be relatively flat. The tangential struts permit thermal expansion and contraction without deformation of the outer duct. As mentioned earlier, we prefer to constitute the inner duct or pipe from highly refractory metal, e.g. a titanium and tungsten containing steel, while the outer duct may be composed of a light metal such as aluminum or an aluminum alloy. Furthermore, the inner duct is relatively thin-walled while the outer duct may have somewhat greater wall thickness. In this fashion, an optimum saving of weight and space can be achieved. Preferably, the hot-gas ducts are so arranged with respect to the compressor and turbine combination that the heat transmitted across the thin wall raises the temperature of the outer gas sheath to a maximum of 200° C.

5. DESCRIPTION OF THE DRAWING

The above and other objects, features and advantages of the present invention will become more readily apparent from the following description, reference being made to the accompanying drawing in which.

6. SPECIFIC DESCRIPTION

Figure 7:
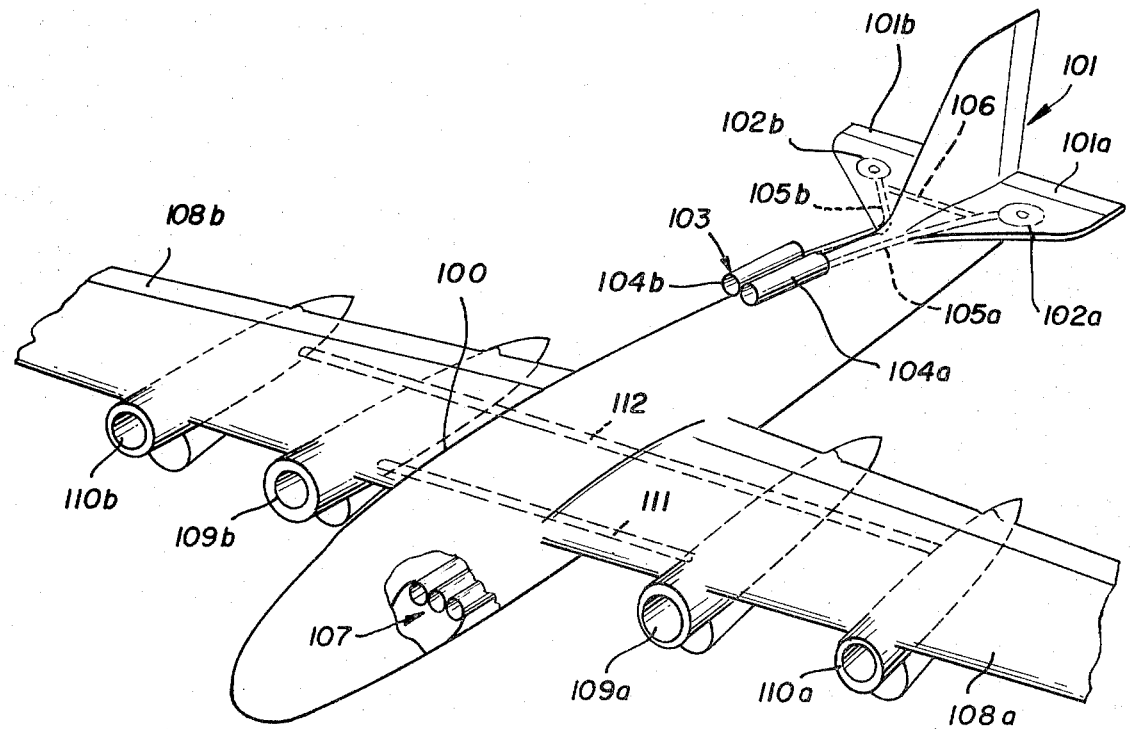
FIG. 7 is a diagrammatic perspective view of an aircraft embodying this invention.

From FIG. 7 it can be seen that an aircraft of the short-takeoff-and-landing (STOL) or vertical takeoff-and-landing (VTOL) type can comprise an airframe with a fuselage 100 with a tail structure 101 having a pair of airfoils 101a 101b provided with gas-driven lift-generating fans 102a and 102b, e.g. of the type described in either of the aforementioned copending applications or U.S. Pat. No. 2,939,649.

A gas-generator system 103 is provided for these fans and comprises a pair of gas turbines 104a, 104b of they type to be described hereinafter in connection with FIGS. 1 and 3. The hot gases are delivered by the turbines 104a, 104b to the fans 102a, 102b by respective ductwork 105a, 105b. Each ductwork consists of a pair of coaxial ducts, the inner of which carries high-temperature gas while the outer duct forms an insulating sheath of relatively cooler gas. A similar coaxial ductwork 106 may be provided to bridge the fans 102a and 102b as described in application Ser. No. 834,647 now abandoned to serve as a gas-redistributing means in the event of failure of one of the gas generators.

The underside of the fuselage 100 may be provided with additional gas generators as represented at 107, coupled with fans lying below the fuselage (as described in application Ser. No. 834,647) via coaxial ducts as will be apparent hereinafter. The fixed primary airfoils 108a, 108b of the aircraft carry a pair of hot-gas generators 109a, 109b, each of which forms a unit with a fan assembly 110a, 110b of the type to be described hereinafter. The gas generators and fans are cross-coupled via ducts 111 and 112 which are of the coaxial type described below.

Figure 1:
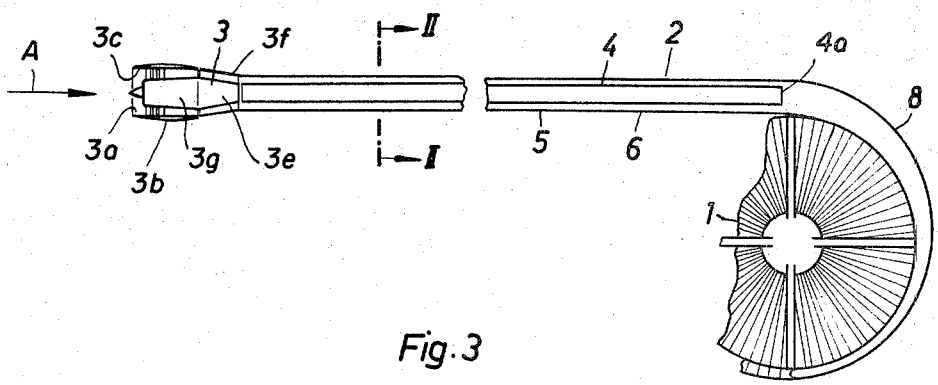
FIG. 1 is a horizontal longitudinal cross-section, in schematic form, of a fan-drive system according to the invention.
Figure 2:
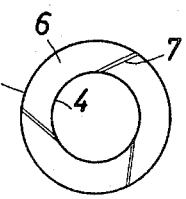
FIG. 2 is a section taken along the line II — II of FIG. 1.

The principles of the present invention are best illustrated in FIGS. 1 and 2 in which a hot-gas generator 3 is shown to supply the driving blades or buckets of a fan 1 via a scroll 8. The gas generator 3 is of the two-stage type and is conventional, but has been shown here in somewhat more than diagrammatic form to facilitate a description functioning of the system. Basically the hot-gas generator comprises a forwardly open housing 3a whose walls may be streamlined at 3b to reduce air resistance, the housing enclosing a space 3c into which air is induced in the direction of arrow A by the compressor blades of the turbine.

The compressed air is forced to the right through the turbine housing and partly passes around the turbine stage 3e in the annular space 3f which communicates with the annular passage 6 of the ductwork. The remaining compressed air is forced into a combustion chamber 3g into which fuel is injected to be ignited so that the high-temperature, high-velocity and relatively hot gases from the combustion chamber 3g are supplied to the turbine 3e. Expansion of the gases in this turbine drives the rotor which, in turn, is mechanically coupled with the compressor blades, while the hot gases are expelled at high velocity axially into the inner duct 4 of the system. In this case, the outer layer of insulating gas is principally air which is not used to sustain combustion, while substantially all of the combustion product flows through the inner duct at high temperature. The gas-generator-and-fan arrangement of FIG. 1 can, of course, be used anywhere on the aircraft as diagrammatically illustrated in FIG. 7.

The hot-gas passage 2 is bounded by the thin-walled refractory-steel inner duct 4 and a light-metal outer duct 5 spacedly surrounding the inner duct 4. The inner duct 4 (FIG. 2) is supported within the outer duct 5 by struts 7 in the form of straps affixed tangentially to the inner duct but running along chords of the outer duct.

As can be seen from FIG. 1, the inner duct 4 terminates at 4a, ahead of the inlet into the lift and/or propulsion fan 1, 8, so that the hot gases mix with the somewhat warmed air of the gas generator and pass into the scroll 8 to drive the turbine blades of the fan in the usual manner.

Figure 3:
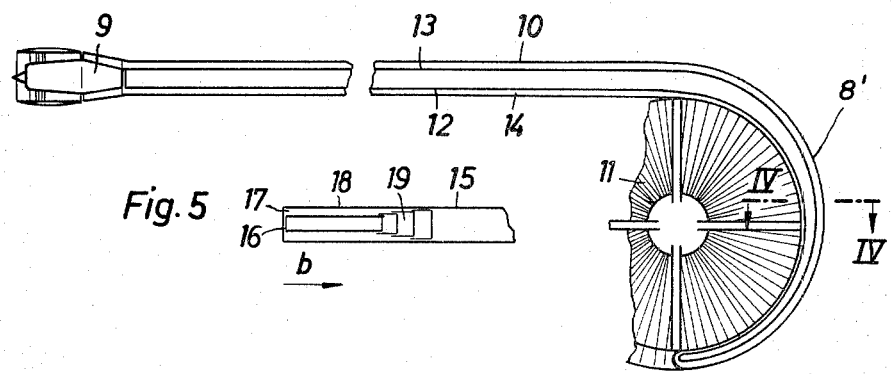
FIG. 3 is a view similar to FIG. 1 illustrating another embodiment of the invention.
Figure 5:
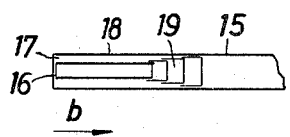
FIG. 5 is a detail view of the outlet end of the inner duct of a conduit system according to the present invention.
Figure 4:
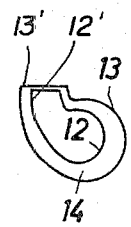
FIG. 4 is a section along the line IV — IV through the scroll of the fan of FIG. 3, drawn to a slightly larger scale.

In FIGS. 3 and 4, we have shown another embodiment of our invention wherein the gas generator 9 operates generally in the manner described for the gas generator 3. The hot-gas ductwork 10 connecting the gas generator 9 with the fan 11 comprises a thin-walled inner duct 12 carrying the hot gases while the outer duct 13 spacedly surrounds the inner duct and carries the cool air displaced by the turbine. In this embodiment, however, the inner duct 12 does not terminate ahead of the scroll 8' but rather is continued within the scroll and provided with nozzle-like openings 12', analogous to the openings 13' of the outer duct, to direct the respective gas streams against the blades of the turbine driving the fan. Any mixing occurs in the drive turbine of the fan. Here again, the hot gases passing through the inner tube 12 are thermally insulated by the sheath of cool gas traversing the passage 14 between the inner and outer tubes. Tangential struts are provided here as well to support the tubes one within the other. In FIG. 5, we show a duct assembly 15 so constructed that, at the end of the inner duct 16 opening into the outer duct 18, there are provided transition pipes 19 of progressively increasing diameter and cross-section ahead of the mouth of the inner duct 16. The hot gases flowing through the inner duct 16 are mixed with the cool air (at a temperature up to 200° C) of the outer duct 18 prior to passage into the fan.

Figure 6:
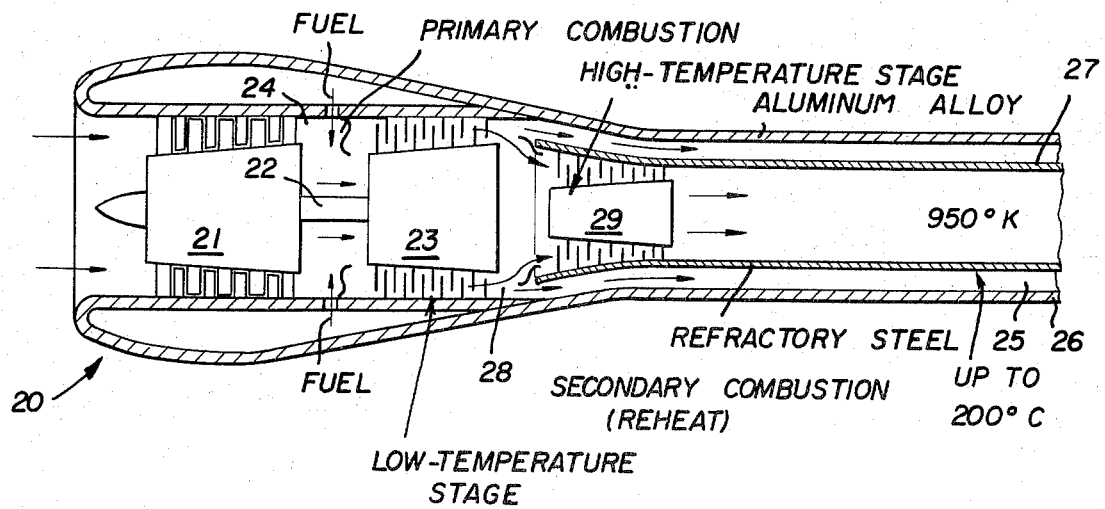
FIG. 6 is a cross-section through a hot-gas generator according to another feature of the invention.

In FIG. 6, we have shown a modification of the system in which a two-stage turbine 20 has a compressor 21 driven by a shaft 22 from a first-stage turbine 23 receiving part of the air from the compressor after the combustion in a chamber represented diagrammatically at 24. The somewhat warmed gases, mixed with any surplus cold air, pass into the space 25 between the outer duct 26 and the inner duct 27. The outer duct is, of course, composed of a light metal such as aluminum alloy while the inner duct 27 is of refractory steel. Some of the gases emerging from the first-stage turbine, i.e. a portion of the remaining air and fuel, are subjected to combustion in the secondary combustion chamber 28 to drive a second-stage turbine 29 whose high-temperature hot gases pass through the inner duct at temperatures of 950° K or thereabove. The turbine of FIG. 6 may be connected with the fans of FIGS. 1 – 4 via any of the mixing systems illustrated.

We claim:

1. In an aircraft, in combination, an airframe; at least one two-stage hot-gas generator, mounted on said airframe, including a downstream stage producing a relatively hot gas and an upstream stage producing a relatively cool gas; at least one gas-driven fan mounted on said airframe at a location remote from said generator for providing a thrust to the aircraft; and ductwork extending through said airframe connecting said generator with said fan, said ductwork comprising a thin-walled inner duct connected with said generator for transporting said relatively hot gas at least part-way to said fan and a thicker-walled outer duct coaxially surrounding said inner duct and defining therewith an annular passage traversed by said relatively cool gas whereby said relatively cool gas forms an insulating sheath around said inner duct.

2. The combination defined in claim 1 wherein said outer duct extends to a gas inlet of said fan, said inner duct terminating short of said gas inlet for permitting mixture of said gases prior to passage into said fan.

3. The combination defined in claim 1 wherein said fan has a driving turbine and a scroll for feeding gas to said turbine, said ductwork being provided ahead of said scroll with means facilitating mixing of said gases prior to entry into said scroll.

4. The combination defined in claim 1 wherein said fan comprises a driving turbine and a scroll feeding said turbine, said ducts extending into said scroll for preventing mixture of said gases until they enter said turbine.

5. The combination defined in claim 1 wherein said inner duct terminates short of said outer duct at a mouth, said ductwork further comprising a plurality of transition tubes of progressively increasing cross section between said mouth and the interior of said outer duct.

6. The combination defined in claim 1, further comprising a plurality of struts extending tangentially from said inner duct to said outer duct and supporting said inner duct in said outer duct.

7. The combination defined in claim 1 wherein said inner duct is composed of refractory steel while said outer duct is composed of a light metal.

8. The combination defined in claim 1 wherein said relatively cool gas is air.

* * * * *